United States Patent
Glotzer et al.

(10) Patent No.: US 10,057,291 B1
(45) Date of Patent: Aug. 21, 2018

(54) COMPARING NETWORKING ACCESS CONTROL LISTS

(71) Applicant: Amazon Technologies, Inc., Seattle, WA (US)

(72) Inventors: John Mark Glotzer, North Bend, WA (US); Apisak Darakananda, Seattle, WA (US); Xiongwei Xie, Charlotte, NC (US)

(73) Assignee: Amazon Technologies, Inc., Seattle, WA (US)

( * ) Notice: Subject to any disclaimer, the term of this patent is extended or adjusted under 35 U.S.C. 154(b) by 412 days.

(21) Appl. No.: 14/938,650

(22) Filed: Nov. 11, 2015

(51) Int. Cl.
*H04L 29/06* (2006.01)

(52) U.S. Cl.
CPC ............ *H04L 63/20* (2013.01); *H04L 63/101* (2013.01)

(58) Field of Classification Search
CPC .... H04L 63/30; H04L 63/101; H04L 63/0227
See application file for complete search history.

(56) References Cited

U.S. PATENT DOCUMENTS

| 6,651,096 B1 * | 11/2003 | Gai .................... | H04L 63/0263 709/223 |
| 7,636,937 B1 * | 12/2009 | Bhattacharya ...... | H04L 63/0263 709/223 |
| 7,904,642 B1 * | 3/2011 | Gupta ............... | G06F 17/30982 711/108 |

\* cited by examiner

*Primary Examiner* — Hadi S Armouche
*Assistant Examiner* — Paul E Callahan
(74) *Attorney, Agent, or Firm* — Klarquist Sparkman, LLP (57) ABSTRACT

Techniques and solutions are provided for assessing the semantic difference between networking access control lists (ACLs). For example, a semantic difference can be determined between an ACL that is currently deployed on a network device and an ACL that is a candidate for deployment. The semantic difference can be presented to a user to better understand what changes would be made to network traffic flow if the candidate ACL is deployed. The semantic difference can also be used in an automated manner to perform automatic deployment of the candidate ACL.

17 Claims, 7 Drawing Sheets

COMPARING NETWORKING ACCESS CONTROL LISTS

BACKGROUND

Network security is an important consideration for computer networks, and particularly for computer networks that connect to the Internet. Network devices, such as routers, firewalls, and network security appliances, can restrict the flow of network traffic using a variety of security techniques, such as packet inspection and filtering.

Commonly, rules for allowing or denying network traffic are managed using access control lists (ACLs). Managing ACLs can be a time consuming process in which rules are manually created and updated. Such manual creation and updating can also lead to network availability problems and/or network security issues. For example, mistakes can be made in the rules when creating or updating ACLs which can result in desired network traffic being denied and/or undesired network traffic being permitted.

DETAILED DESCRIPTION

Overview

The following description is directed to technologies for assessing the semantic difference between networking access control lists (ACLs). The semantic difference can be used in a variety of ways. For example, a semantic difference can be determined between an ACL that is currently deployed on a network device and an ACL that is a candidate for deployment to the network device. The semantic difference can be presented to a user (e.g., a network administrator) to better understand the changes that would be made to network traffic flow if the candidate ACL is deployed to replace the currently deployed ACL. The semantic difference can also be used in an automated manner to facilitate automatic deployment of the candidate ACL (e.g., if the semantic difference indicates that the change from the deployed ACL to the candidate ACL would likely be safe).

A semantic difference is determined between two low-level ACLs for a particular network device (e.g., a deployed low-level ACL and a candidate low-level ACL). Device-level ACL files that contain ACL rules in a low-level representation are parsed to generate a high-level representation. The high-level representation is generated in a common ACL data structure format. By using a common ACL data structure format, extensibility of the semantic analysis is provided (e.g., semantic analysis can be extended to new device-level ACL formats by creating a new parser to parse each new device-level ACL format). Once the high-level ACL representations have been generated, they are compared. Semantic analysis is then performed using results of the comparison to determine the semantic difference between the high-level ACL representations. The semantic difference reflects the meaning of the changes in the device-level ACL files as they are represented in the high-level representations. More specifically, the semantic analysis is performed at the level of the high-level representations, and the resulting semantic difference is a high-level representation of the difference between the two device-level ACL files.

In some implementations, an indication of the semantic difference is reported to the user. In some implementations, the semantic difference is used to determine whether to deploy a device-level ACL. Some implementations also support comparison of device-level ACLs from different network devices (e.g., different network devices using different device-level ACL formats) using high-level representations generated in the common ACL data structure format.

In the technologies described herein, networking ACLs are rules that define whether network traffic is to be allowed or denied. In some types of ACLs (called data plane ACLs), the rules define whether network traffic is permitted to pass through a given device. In other types of ACLs (called control plane ACLs), the rules define whether network traffic is permitted to reach a destination device (e.g., is allowed to be received and processed by a network device). ACL rules are defined in terms of Internet protocol (IP) addresses, port numbers, network protocols, and/or other networking details. The technologies described herein can be used to perform semantic analysis of various types of ACLs, including data plane ACLs, control plane ACLs, and/or other types of networking ACLs.

ACLs can provide security for a network by blocking potential threats. However, because ACLs have the ability to block network traffic as it flows through the network, an incorrectly configured ACL can negatively affect the flow of network traffic. For example, if an ACL rule controlling access to a web server is mistakenly designated as a deny rule (rather than an allow rule), access to the web server may be cut off. As another example, an IP address range may be entered incorrectly resulting in the IP address range being blocked from reaching a host providing a network service.

In some implementations, an automated ACL management tool is provided for managing ACLs (e.g., creating, editing, and deploying ACLs). For example, the automated ACL management tool can receive ACL rules defined in terms of domain names, groups of hosts, prefix lists, and/or other higher level constructs. The automated ACL management tool can then translate the received ACL rules into low-level ACL rules (referred to as a device-level representation) that can be implemented by network devices. For example, the automated ACL management tool can translate domain names to IP addresses. The device-level representation of the ACL rules is specific to the type of network device that the ACL rules will be deployed to, and different types of network devices (e.g., different network device models, manufacturers, etc.) may have different formats for their device-level representations.

ACLs can change frequently. For example, the state of a network (e.g., a large network) can change frequently for a number of reasons, such as new hosts being deployed, hosts being taken out of service (e.g., for maintenance), domain name system (DNS) changes, changes to network services, etc. In some implementations, an automated ACL management tool updates ACL rules and creates new candidate device-level files on a daily basis for updating network devices.

Device-Level Representation of ACL Rules

In the technologies described herein, a device-level representation of ACL rules refers to ACL rules that are in a format ready for deployment to a network device (also called device-level ACL rules). Different types of network devices (e.g., different network device manufacturers) can have different ACL rule formats for their particular network devices.

A simplified example of a device-level ACL rule is the following ACL rule:

permit tcp 192.168.15.0 255.255.255.0 range 0 65535 host 192.168.1.1 eq 80

The above ACL rule permits transmission control protocol (TCP) traffic from the IP addresses in the 192.168.15.0/24 network to destination IP address 192.168.1.1 on network port 80.

In some implementations, device-level ACL rules are created using a tool, such as an automated ACL management tool. The tool is used to define ACL rules in a user-level format, which the tool then translates to device-level ACL rules for one or more network device types. For example, the tool may allow a user (e.g., a network administrator) to create ACL rules by defining parameters including: source address, source port, destination address, destination port, network protocol, action, and/or other parameters. When defining source and destination addresses, user-level designations can be used, such as domain names, groups of hosts, etc.

When using a tool to define ACL rules, a single user-level rule can generate a number of device-level ACL rules. In some situations, the number of device-level ACL rules that are generated can be large (e.g., hundreds or thousands). For example, consider a scenario in which five specific hosts (associated with five specific IP addresses) are grouped as "host group A" and ten other specific hosts (associated with ten specific IP addresses) are grouped as "host group B." A user-level rule can be created for permitting host group A to talk to host group B (e.g., using a specific network protocol and port number, such as TCP port 80). Translating the user-level rule to device-level ACL rules can result in 50 device-level ACL rules, one device-level ACL rule for each combination of specific host in host group A and host group B. A simplified example of a set of device-level ACL rules is as follows:

remark rule 248, allow host group A to host group B
permit tcp 192.168.15.20 255.255.255.255 range 0 65535 host 10.1.1.5 eq 80
permit tcp 192.168.16.5 255.255.255.255 range 0 65535 host 10.1.1.5 eq 80
permit tcp 192.168.16.33 255.255.255.255 range 0 65535 host 10.1.1.5 eq 80
permit tcp 192.168.16.52 255.255.255.255 range 0 65535 host 10.1.1.5 eq 80
permit tcp 192.168.16.70 255.255.255.255 range 0 65535 host 10.1.1.5 eq 80
permit tcp 192.168.15.20 255.255.255.255 range 0 65535 host 10.3.1.8 eq 80
permit tcp 192.168.16.5 255.255.255.255 range 0 65535 host 10.3.1.8 eq 80
permit tcp 192.168.16.33 255.255.255.255 range 0 65535 host 10.3.1.8 eq 80
permit tcp 192.168.16.52 255.255.255.255 range 0 65535 host 10.3.1.8 eq 80
permit tcp 192.168.16.70 255.255.255.255 range 0 65535 host 10.3.1.8 eq 80
permit tcp 192.168.15.20 255.255.255.255 range 0 65535 host 10.4.1.15 eq 80
permit tcp 192.168.16.5 255.255.255.255 range 0 65535 host 10.4.1.15 eq 80
permit tcp 192.168.16.33 255.255.255.255 range 0 65535 host 10.4.1.15 eq 80
permit tcp 192.168.16.52 255.255.255.255 range 0 65535 host 10.4.1.15 eq 80
permit tcp 192.168.16.70 255.255.255.255 range 0 65535 host 10.4.1.15 eq 80
permit tcp 192.168.15.20 255.255.255.255 range 0 65535 host 10.7.3.8 eq 80
permit tcp 192.168.16.5 255.255.255.255 range 0 65535 host 10.7.3.8 eq 80
permit tcp 192.168.16.33 255.255.255.255 range 0 65535 host 10.7.3.8 eq 80
permit tcp 192.168.16.52 255.255.255.255 range 0 65535 host 10.7.3.8 eq 80
permit tcp 192.168.16.70 255.255.255.255 range 0 65535 host 10.7.3.8 eq 80
permit tcp 192.168.15.20 255.255.255.255 range 0 65535 host 10.12.9.1 eq 80
permit tcp 192.168.16.5 255.255.255.255 range 0 65535 host 10.12.9.1 eq 80
permit tcp 192.168.16.33 255.255.255.255 range 0 65535 host 10.12.9.1 eq 80
permit tcp 192.168.16.52 255.255.255.255 range 0 65535 host 10.12.9.1 eq 80
permit tcp 192.168.16.70 255.255.255.255 range 0 65535 host 10.12.9.1 eq 80
permit tcp 192.168.15.20 255.255.255.255 range 0 65535 host 10.15.5.2 eq 80
permit tcp 192.168.16.5 255.255.255.255 range 0 65535 host 10.15.5.2 eq 80
permit tcp 192.168.16.33 255.255.255.255 range 0 65535 host 10.15.5.2 eq 80
permit tcp 192.168.16.52 255.255.255.255 range 0 65535 host 10.15.5.2 eq 80
permit tcp 192.168.16.70 255.255.255.255 range 0 65535 host 10.15.5.2 eq 80
permit tcp 192.168.15.20 255.255.255.255 range 0 65535 host 10.16.25.40 eq 80
permit tcp 192.168.16.5 255.255.255.255 range 0 65535 host 10.16.25.40 eq 80
permit tcp 192.168.16.33 255.255.255.255 range 0 65535 host 10.16.25.40 eq 80
permit tcp 192.168.16.52 255.255.255.255 range 0 65535 host 10.16.25.40 eq 80
permit tcp 192.168.16.70 255.255.255.255 range 0 65535 host 10.16.25.40 eq 80
permit tcp 192.168.15.20 255.255.255.255 range 0 65535 host 10.31.18.9 eq 80
permit tcp 192.168.16.5 255.255.255.255 range 0 65535 host 10.31.18.9 eq 80 permit tcp 192.168.16.33 255.255.255.255 range 0 65535 host 10.31.18.9 eq 80
permit tcp 192.168.16.52 255.255.255.255 range 0 65535 host 10.31.18.9 eq 80
permit tcp 192.168.16.70 255.255.255.255 range 0 65535 host 10.31.18.9 eq 80
permit tcp 192.168.15.20 255.255.255.255 range 0 65535 host 10.34.7.7 eq 80
permit tcp 192.168.16.5 255.255.255.255 range 0 65535 host 10.34.7.7 eq 80
permit tcp 192.168.16.33 255.255.255.255 range 0 65535 host 10.34.7.7 eq 80
permit tcp 192.168.16.52 255.255.255.255 range 0 65535 host 10.34.7.7 eq 80
permit tcp 192.168.16.70 255.255.255.255 range 0 65535 host 10.34.7.7 eq 80
permit tcp 192.168.15.20 255.255.255.255 range 0 65535 host 10.44.1.4 eq 80
permit tcp 192.168.16.5 255.255.255.255 range 0 65535 host 10.44.1.4 eq 80
permit tcp 192.168.16.33 255.255.255.255 range 0 65535 host 10.44.1.4 eq 80
permit tcp 192.168.16.52 255.255.255.255 range 0 65535 host 10.44.1.4 eq 80
permit tcp 192.168.16.70 255.255.255.255 range 0 65535 host 10.44.1.4 eq 80

The above device-level ACL rules permit each of the five specific hosts in host group A (IP addresses 192.168.15.20, 192.168.16.5, 192.168.16.33, 192.168.16.52, and 192.168.16.70) to talk to the ten specific hosts in host group B (IP address 10.1.1.5, 10.3.1.8, 10.4.1.15, 10.7.3.8, 10.12.9.1, 10.15.5.2, 10.16.25.40, 10.31.18.9, 10.34.7.7, and 10.44.1.4). While only 50 rules are generated in this example, other situations may generate a much larger number of rules (e.g., a host class with 50 hosts in one group and 200 hosts in another group can generate 10,000 rules).

High-Level ACL Representation Using a Data Structure Format

In the technologies described herein, device-level ACL rules can be parsed to create a high-level ACL representation of the device-level ACL rules using a data structure format. The data structure format can contain entries for the following information: a rule identifier (e.g., a rule number and/or other rule identifying information for a collection of one or more rules from which the high-level ACL representation entry is generated), an action (e.g., allow or deny), a network protocol (e.g., TCP, UDP, or another network protocol), a list of one or more source hosts (e.g., identified by IP address, domain name, groups of hosts, etc.), a list of one or more source ports, a list of one or more destination hosts (e.g., identified by IP address, domain name, groups of hosts, etc.), and/or a list of one or more destination ports. Other information can be included as well (e.g., a description of the rule or rules included in the data structure). In some implementations, the data structure format contains the following entries:
  (Rule)
  (Action)
  (Protocol)
  {Port[(source port range or value)], Port[(destination port range or value)]}
  [{src[(list of one or more source networks or addresses)], dst[(list of one or more destination networks or addresses)]}]

Parsing the device-level ACLs can comprise identifying multiple device-level ACLs grouped using an ACL rule identifier and creating one corresponding entry in the data structure format representing the multiple device-level ACLs. For example, a number of device-level ACLs that all allow different source hosts to access the same destination on the same port (or range of ports) can be parsed to create a single entry in the high-level representation. In this manner, one entry in the high-level representation can be created for each ACL rule identifier.

As an example, the following device-level ACL rule number 248 (permit tcp 192.168.15.0 255.255.255.0 range 0 65535 host 192.168.1.1 eq 80) can be parsed to create the following high-level ACL representation using the data structure format described above:
  248, Allow, TCP {Port[0,65535], Port[80]}
  [{src[192.168.15.0/24], dst[192.168.1.1/32]}]

The high-level ACL representation is capable of representing a number of individual device-level ACLs using a single data structure. For example, consider the following five device-level ACLs grouped as ACL rule 248:
  remark rule 248
  permit tcp 192.168.15.20 255.255.255.255 range 0 65535 host 10.1.1.5 eq 80
  permit tcp 192.168.16.5 255.255.255.255 range 0 65535 host 10.1.1.5 eq 80
  permit tcp 192.168.16.33 255.255.255.255 range 0 65535 host 10.1.1.5 eq 80
  permit tcp 192.168.16.52 255.255.255.255 range 0 65535 host 10.1.1.5 eq 80
  permit tcp 192.168.16.70 255.255.255.255 range 0 65535 host 10.1.1.5 eq 80

The remark line at the beginning serves to identify the five device-level ACL rules for comparison purposes so that the same grouping of rules can be compared after being parsed to generate the high-level representations. The remark line is not processed as an ACL rule, and depending on the device-level format the remark line can be represented in other ways (e.g., to represent an unprocessed comment within the device-level ACL file). These five device-level ACL rules can be parsed to create a high-level ACL representation using the data structure format described above:
  248, Allow, TCP{Port[0,65535], Port[80]}
  [{src[192.168.15.20/32, 192.168.16.5/32, 192.168.16.33/32, 192.168.16.52/32 192.168.16.70/32], dst[10.1.1.5/32]} ]

The high-level ACL representation data structure format described above is a common ACL data structure format that is a device-independent format capable of representing ACL rules from a number of different device-level formats (e.g., from different network device manufacturers).

Comparing High-Level ACL Representations and Determining a Semantic Difference In the technologies described herein, high-level ACL representations in a data structure format can be compared. For example, a first high-level ACL representation can be created by parsing a first device-level ACL file (e.g., a deployed ACL file) to create a high-level ACL representation of the first device-level ACL file using the data structure format and a second high-level ACL representation can be created by parsing a second device-level ACL file (e.g., a candidate ACL file) to create a high-level ACL representation of the second device-level ACL file using the data structure format. The two high-level ACL representations can be compared to determine the differences between them.

For example, if the high-level ACL representations are created from a deployed ACL file and a candidate ACL file, then the differences can specify how the ACL rules would change if the candidate ACL file replaces the deployed ACL file.

In order to illustrate the comparison, consider a deployed ACL file with the following five device-level ACL rules (grouped as rule ID 248):

remark rule 248
permit tcp 192.168.15.20 255.255.255.255 range 0 65535 host 10.1.1.5 eq 80
permit tcp 192.168.16.5 255.255.255.255 range 0 65535 host 10.1.1.5 eq 80
permit tcp 192.168.16.33 255.255.255.255 range 0 65535 host 10.1.1.5 eq 80
permit tcp 192.168.16.52 255.255.255.255 range 0 65535 host 10.1.1.5 eq 80
permit tcp 192.168.16.70 255.255.255.255 range 0 65535 host 10.1.1.5 eq 80

These five device-level ACL rules can be parsed to create the following high-level ACL representation using the data structure format described above:

248, Allow, TCP{Port[0,65535], Port[80]}
[{src[192.168.15.20/32, 192.168.16.5/32, 192.168.16.33/32, 192.168.16.52/32 192.168.16.70/32], dst[10.1.1.5/32]} ]

Next, consider a candidate ACL file with the following six device-level ACL rules (in which two new hosts have been and one host has been removed):

remark rule 248
permit tcp 192.168.15.20 255.255.255.255 range 0 65535 host 10.1.1.5 eq 80
permit tcp 192.168.16.5 255.255.255.255 range 0 65535 host 10.1.1.5 eq 80
permit tcp 192.168.16.52 255.255.255.255 range 0 65535 host 10.1.1.5 eq 80
permit tcp 192.168.16.70 255.255.255.255 range 0 65535 host 10.1.1.5 eq 80
permit tcp 192.168.100.85 255.255.255.255 range 0 65535 host 10.1.1.5 eq 80
permit tcp 192.168.100.92 255.255.255.255 range 0 65535 host 10.1.1.5 eq 80

These six device-level ACL rules can be parsed to create the following high-level ACL representation using the data structure format described above:

248, Allow, TCP{Port[0,65535], Port[80]}
[{src[192.168.15.20/32, 192.168.16.5/32, 192.168.16.52/32, 192.168.16.70/32, 192.168.100.85/32, 192.168.100.92/32], dst[10.1.1.5/32]} ]

By comparing the high-level representations of the deployed ACL file and the candidate ACL file for the same rule identifier (rule ID 248 in this example), the differences can be identified as the deletion of one host (source IP address 192.168.16.33) and the addition of two hosts (source IP addresses 192.168.100.85 and 192.168.100.92).

Semantic analysis can then be performed using results of the comparison to generate a semantic difference between the high-level representations. In this example, the meaning of the changes to the ACL rules is that the ACL rules for permitting access to host 10.1.1.5 on port 80 have changed such that one particular host will no longer be permitted while two particular hosts will be permitted. The semantic difference can be described using a format that indicates which portions of the rules change and which portions remain the same between the high-level representations:

Rule: 248
Action: no change (Allow)
Protocol: no change (TCP{Port[0,65535], Port[80]})
Source IP add=[192.168.100.85/32, 192.168.100.92/32]
Source IP delete=[192.168.16.33/32]
Destination IP add=no change
Destination IP delete=no change The semantic difference in the above format can be used to quickly and efficiently understand how the ACL rules would change if the deployed ACL file is replaced with the candidate ACL file. The semantic difference in the above format can be output (e.g., displayed to a user to understand how the changes would affect traffic flow, saved to a log file, etc.).

Semantic analysis can also be used to describe how high-level ACL representations differ using high-level concepts (e.g., groups of hosts). For example, consider the scenario described above in which five specific hosts (associated with five specific IP addresses) are grouped as "host group A" and ten other specific hosts (associated with ten specific IP addresses) are grouped as "host group B." An example high-level ACL representation from a deployed ACL file could be:

248, Allow, Host Group A, Host Group B, TCP{Port[0,65535], Port[80]}
[{src[192.168.15.20/32, 192.168.16.5/32, 192.168.16.33/32, 192.168.16.52/32, 192.168.16.70/32], dst[10.1.1.5/32, 10.3.1.8/32, 10.4.1.15/32, 10.7.3.8/32, 10.12.9.1/32, 10.15.5.2/32, 10.16.25.40/32, 10.31.18.9/32, 10.34.7.7/32, 10.44.1.4/32]} ]

Next, consider the following high-level ACL representation from a candidate ACL file in which one additional host has been added to host group A:

248, Allow, Host Group A, Host Group B, TCP{Port[0,65535], Port[80]}
[{src[192.168.15.20/32, 192.168.16.5/32, 192.168.16.33/32, 192.168.16.52/32, 192.168.16.70/32, 192.168.100.85/32], dst[10.1.1.5/32, 10.3.1.8/32, 10.3.1.15/32, 10.3.1.20/32, 10.3.1.35/32, 10.3.1.61/32, 10.3.1.85/32, 10.7.1.9/32, 10.7.1.20/32, 10.7.1.29/32]} ]

Semantic analysis can be performed on the above two example high-level ACL representations to determine the meaning of the change. In this example, the meaning of the change (the semantic difference between the high-level representations for the collection of ACL rules identified as rule 248) is that one specific host has been added to host group A while the remaining ACL rule details have remained the same. This semantic difference can be represented as (the one additional IP address added is 192.168.100.85):

Rule: 248
Action: no change (Allow) Host Group A to Host Group B
Protocol: no change (TCP{Port[0,65535], Port[80]})
Source IP add=[192.168.100.85/32]
Source IP delete=no change
Destination IP add=no change
Destination IP delete=no change Determining the semantic difference between the high-level representations can provide advantages over other techniques. For example, in a previous solution the Unix diff utility (a line-oriented utility that compares two files and outputs the textual difference between them) was used to generate a textual difference between a deployed device-level ACL file and a candidate device-level ACL file. The diff utility output could then be examined by a user and/or by an automated procedure to count the number of lines that changed. However, using diff utility output is problematic for a number of reasons. For example, diff utility output only lists the textual differences, and a user viewing the textual differences may have difficulty understanding the meaning of the changes. As another example, the number of lines that changed based on the diff utility output may not provide a meaningful indicator of the risk of making the change (e.g., a high number of changed lines may not correlate strongly to a risky change). Therefore, the diff utility comparison is of limited help in analyzing the changes between to device-level ACL files.

In order to illustrate the advantages of determining the semantic difference over using the output of the diff utility, consider the immediately preceding scenario with five hosts in host group A and ten hosts in host group A, and where one specific host has been added to host group A (IP address 192.168.100.85). In this scenario, the Unix diff output would be the following:

7d6<permit tcp 192.168.100.85 255.255.255.255 range 0 65535 host 10.1.1.5 eq 80
13d11<permit tcp 192.168.100.85 255.255.255.255 range 0 65535 host 10.3.1.8 eq 80
19d16<permit tcp 192.168.100.85 255.255.255.255 range 0 65535 host 10.4.1.15 eq 80
25d21<permit tcp 192.168.100.85 255.255.255.255 range 0 65535 host 10.7.3.8 eq 80
31d26<permit tcp 192.168.100.85 255.255.255.255 range 0 65535 host 10.12.9.1 eq 80
37d31<permit tcp 192.168.100.85 255.255.255.255 range 0 65535 host 10.15.5.2 eq 80
43d36<permit tcp 192.168.100.85 255.255.255.255 range 0 65535 host 10.16.25.40 eq 80
49d41<permit tcp 192.168.100.85 255.255.255.255 range 0 65535 host 10.31.18.9 eq 80
55d46<permit tcp 192.168.100.85 255.255.255.255 range 0 65535 host 10.34.7.7 eq 80
61d51<permit tcp 192.168.100.85 255.255.255.255 range 0 65535 host 10.44.1.4 eq 80

As this example illustrates, the Unix diff utility produces the lines that are different between the two device-level ACL files, but lacks the meaning behind the change. On the other hand, with the semantic difference the meaning is clear (that one host has been added to host group A).

The semantic difference can also indicate a pattern that is recognized across a number of different device-level ACL rules identified by corresponding rule numbers. For example, high-level representations of three groups of device-level ACL rules, identified by rule numbers 13, 19, and 29, can be compared to generate a semantic difference that represents a single "pattern." The rule numbers can be grouped, for example, because the device-level ACL rules deal with the same source and destination hosts but different port numbers, deal with the same destination hosts and port numbers but have different source hosts, or have another type of pattern in common. The following is an example semantic difference generated from groups of device-level ACL rules identified by rule numbers 13, 19, 29, which collectively have many attributes in common (the same action, protocol, port numbers, and destination hosts), but with changes in source hosts between deployed and candidate ACL files (specifically in which two source hosts have been added, and one has been deleted):

Type: Pattern
Rules: 13, 19, 29
Action: no change (Allow)
Protocol: no change (TCP{Port[0,65535], Port[80])
Source IP add=[192.168.150.2/32, 192.168.15.120/29]
Source IP delete=[192.168.55.80/32]
Destination IP add=no change
Destination IP delete=no change The semantic difference can be used to quickly and efficiently understand how the ACL rules would change if the deployed ACL file is replaced with the candidate ACL file. For example, without performing the semantic analysis to determine the semantic difference, a user may have to examine the device-level difference between the ACL rules (e.g., using a comparison tool such as the diff utility) to try and determine what has changed and why.

Environments for Assessing the Semantic Difference Between ACLs

In any of the implementations described herein, environments can be provided for assessing the semantic difference between ACLs. For example, the environment can comprise one or more computing devices (e.g., a computer servers, network devices, etc.) and/or one or more computer networks. For example, the environment can comprise one or more computing devices running an automated ACL management tool.

Figure 1:
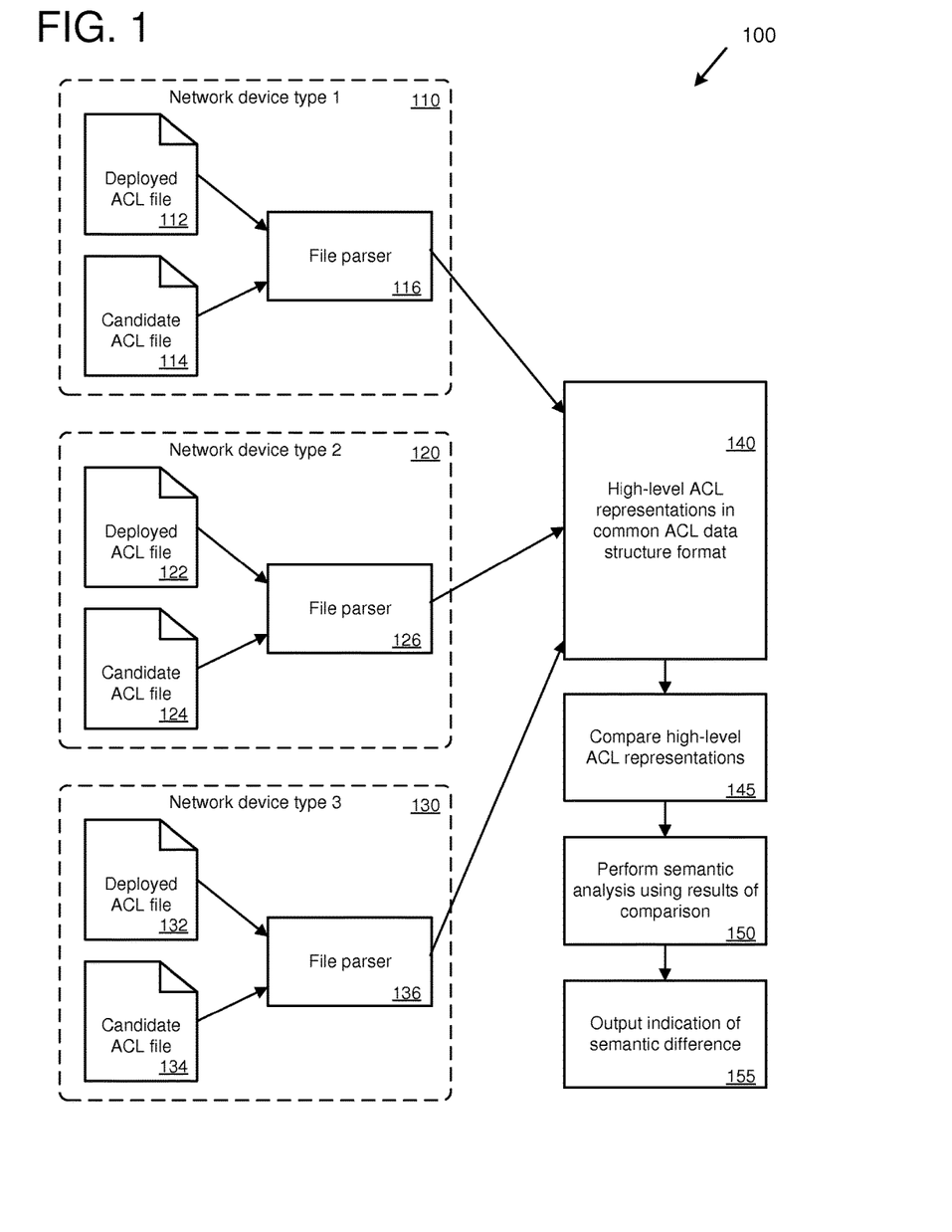
FIG. 1 is a diagram of an example environment in which semantic analysis can be performed using high-level representations of networking access control lists (ACLs).

FIG. 1 is a diagram of an example environment 100 in which semantic analysis is performed using high-level ACL representations. As depicted in the example environment 100, a number of different file parsers are provided for parsing device-level ACL files in different network device formats. Specifically, file parser 116 is provided for parsing ACL files in a device-level format for a first network device type 110. For example, the first network device type 110 could be a device-level ACL format for a particular type of Cisco® network devices (e.g., for Cisco Adaptive Security Appliance (ASA) network devices). A second file parser 126 is provided for parsing ACL files in a device-level format for a second network device type 120. For example, the second network device type 120 could be a device-level ACL format for another particular type of Cisco network devices (e.g., for Cisco Private Internet eXchange (PIX) network devices). A third file parser 136 is provided for parsing ACL files in a device-level format for a third network device type 130. For example, the third network device type 130 could be a device-level ACL format for Juniper Networks® network devices. While three specific file parsers are depicted in the example environment 100, other implementations can support a different number of file parsers (e.g., more, or fewer, than three file parsers) for parsing device-level ACL files for a corresponding different number of network device types. In this way, the example environment 100 is extensible to support an arbitrary number of different device-level ACL formats by creating a new file parser configured to parse each new device-level ACL format.

Each of the file parsers 116, 126, and 136 is configured to parse device-level ACL files for its network device type to generate high-level ACL representations of the device-level ACL files in a common ACL data structure format, as depicted at 140. Specifically, file parser 116 parses device-level ACL files, including deployed ACL file 112 and candidate ACL file 114. File parser 126 parses device-level ACL files, including deployed ACL file 122 and candidate ACL file 124. File parser 136 parses device-level ACL files, including deployed ACL file 132 and candidate ACL file 134.

As depicted at 145, the high-level ACL representations in the common ACL data structure format are compared. As depicted at 150, semantic analysis is performed using results of the comparison. As depicted at 155, an indication of the semantic difference is output (e.g., displayed to a user, saved to a log file, etc.).

For example, deployed ACL file 112 can be obtained and parsed (using file parser 116) to generate a high-level ACL representation of the deployed ACL file 112 in the common ACL data structure format (as depicted at 140). Candidate ACL file 114 can then be obtained and parsed (using file parser 116) to generate a high-level ACL representation of the candidate ACL file 114 in the common ACL data structure format (as depicted at 140). The two high-level ACL representations can then be compared, as depicted at 145. Semantic analysis can then be performed, as depicted at 150, to determine a semantic difference between the high-level representation of the deployed ACL file 112 and the high-level representation of the candidate ACL file 114. An indication of the semantic difference can then be output, as depicted at 155.

Using the example environment 100, the effect of deploying a new device-level ACL file can be more easily understood and evaluated (e.g., by a user and/or by an automated procedure). For example, a user can determine whether to deploy a candidate ACL file by reviewing the semantic difference. As another example, an automated procedure can evaluate the effect of deploying a candidate ACL file (e.g., determine a risk score) and only deploy the candidate ACL file if it would not disrupt network operations (e.g., if the risk score is below a threshold value).

In some implementations, the semantic analysis is performed by an ACL management tool running on one or more computing devices (e.g., one or more computer servers). For example, the ACL management tool can obtain the deployed and candidate ACL files (e.g., from local storage and/or by retrieving the files from a remote location). The ACL management tool can operate the file parsers (116, 126, and 136) and perform the operations for comparing the high-level ACL representations (as depicted at 145), performing the semantic analysis (as depicted at 150), and outputting the indication of the semantic difference (as depicted at 155).

Figure 2:
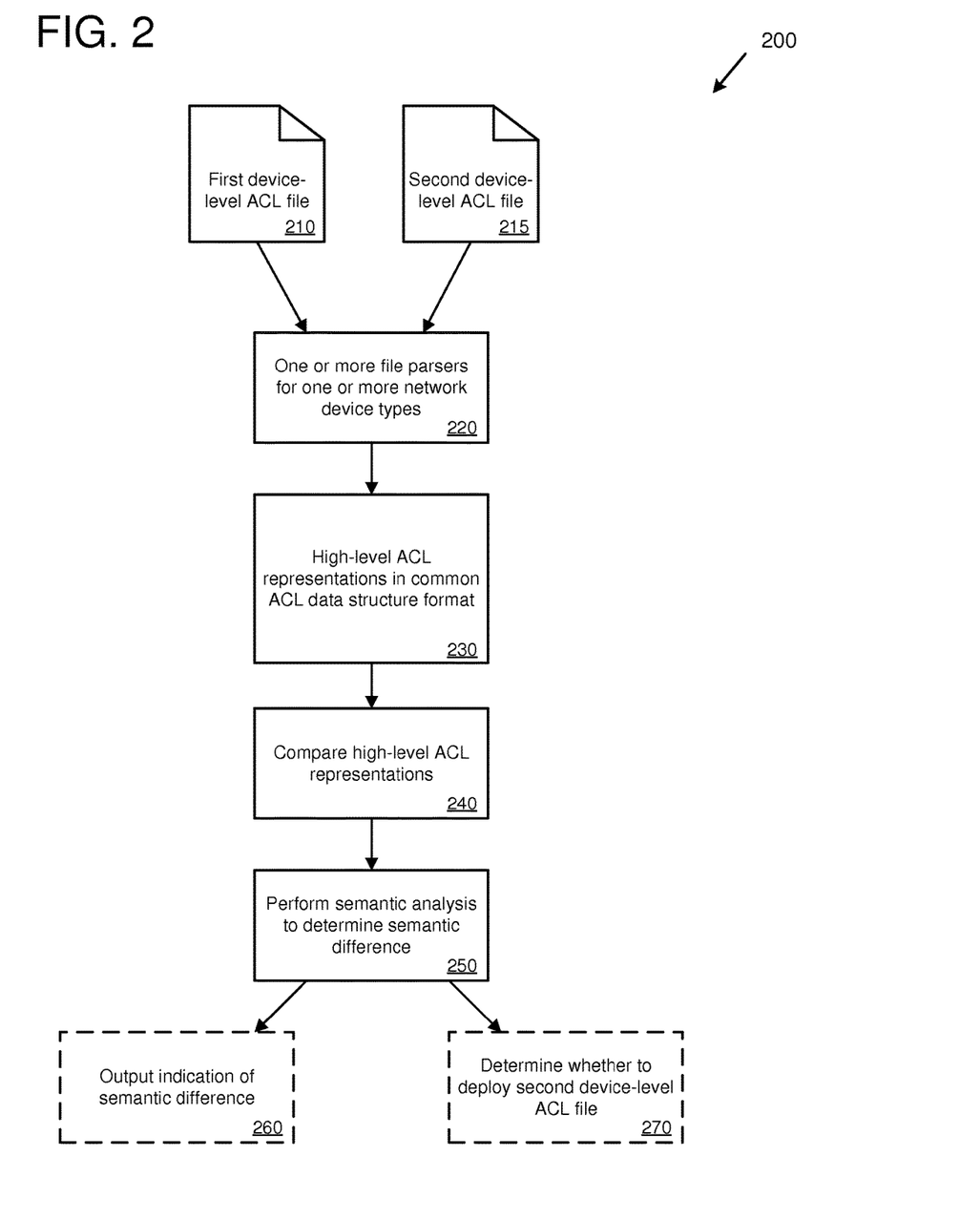
FIG. 2 is a block diagram for performing semantic analysis on high-level representations of ACL files.

FIG. 2 is a block diagram 200 for performing semantic analysis on high-level representations of ACL files. The block diagram 200 includes one or more file parsers 220. The one or more file parsers 220 parse device-level ACL files, including a first device-level ACL file 210 (e.g., a deployed ACL file) and a second device-level ACL file 215 (e.g., a candidate ACL file). The first device-level ACL file 210 and the second device-level ACL file 215 may be in the same device format (e.g., in a format for deploying on the same type of network device) or in different device formats. The one or more file parsers 220 parse the device-level ACL files to generate a high-level ACL representation of the first device-level ACL file 210 and the second device-level ACL file 215 in a common ACL data structure format, as depicted at 230.

The high-level ACL representations are then compared, as depicted at 240. Semantic analysis is then performed using results of the comparison to determine the semantic difference between the high-level ACL representation of the first device-level ACL file 210 and the second device-level ACL file 215, as depicted at 250.

In some implementations, an indication of the semantic difference is output (e.g., provided for display to a user, saved to a log file, etc.), as depicted at 260. In some implementations, a determination is made whether to deploy the second device-level ACL file (e.g., based on a calculated risk score), as depicted at 270.

Methods for Assessing the Semantic Difference Between ACLs

In any of the technologies described herein, methods can be provided assessing the semantic difference between ACLs.

Figure 3:
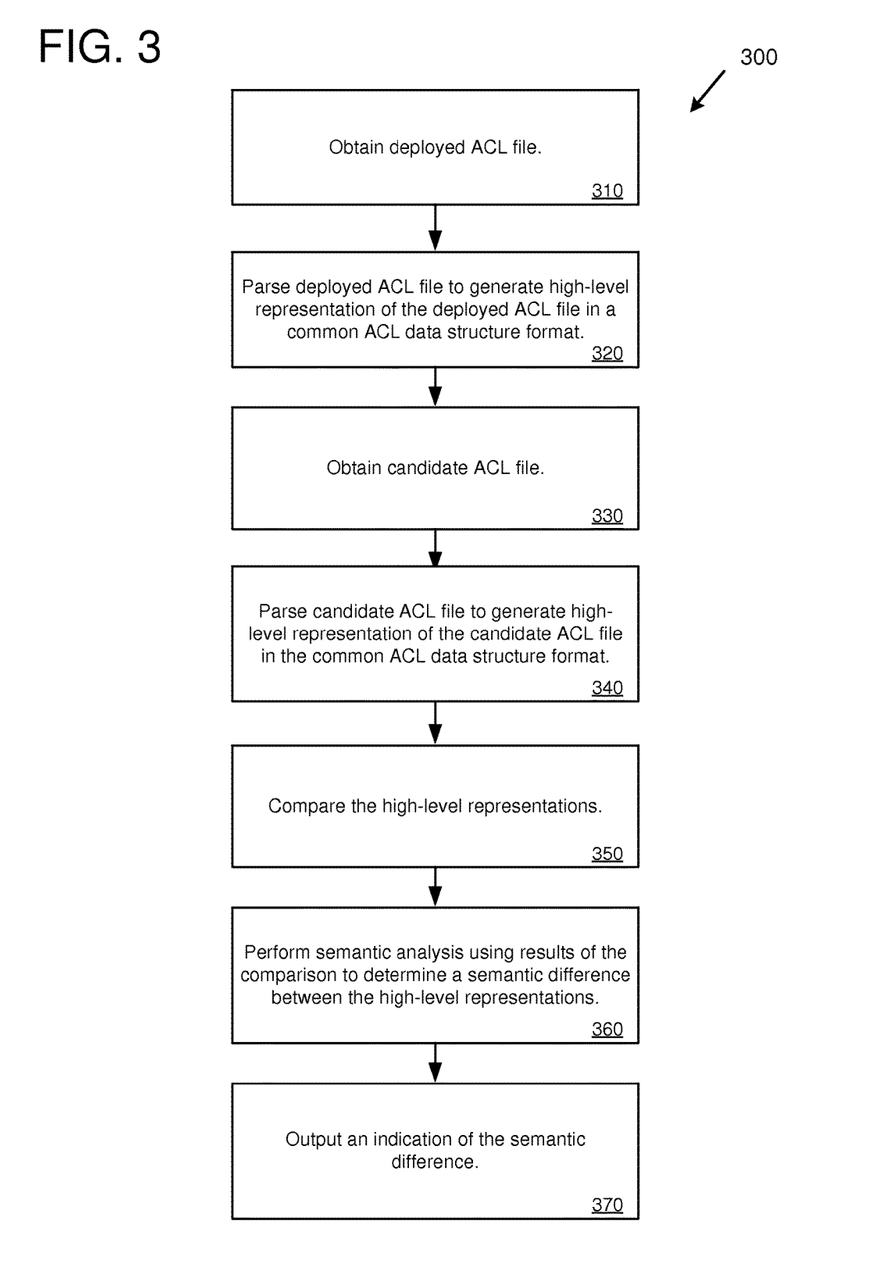
FIG. 3 is a flowchart of an example method for assessing the semantic difference between a deployed ACL file and a candidate ACL file.

FIG. 3 is a flow chart of an example method 300 for assessing the semantic difference between a deployed ACL file and a candidate ACL file. At 310, a deployed ACL file is obtained. The deployed ACL file comprises ACL rules in a device-level representation (e.g., in an ACL format for a particular type of network device or manufacturer). The deployed ACL file can be obtained from a network device or from another source (e.g., from local storage of an ACL management tool).

At 320, the deployed ACL file is parsed to generate a high-level representation of the deployed ACL file in a common ACL data structure format. The common ACL data structure format is a device-independent format.

At 330, a candidate ACL file is obtained. The candidate ACL file comprises ACL rules in the same device-level representation as the deployed ACL file. The candidate ACL file can be obtained from an ACL management tool or from another source. The candidate ACL file is intended to replace the deployed ACL file on a network device (e.g., a router, a firewall, a switch, a network security appliance, or another type of network device).

At 340, the candidate ACL file is parsed to generate a high-level representation of the candidate ACL file in the common ACL data structure format.

At 350, the high-level ACL representation of the deployed ACL file and the high-level representation of the candidate ACL file are compared.

At 360, semantic analysis is performed using results of the comparison to determine the semantic difference between the high-level representation of the deployed ACL file and the high-level representation of the candidate ACL file. In some implementations, the semantic difference comprises an indication of changes to source hosts, an indication of changes to destination hosts, an indication of changes to source ports, an indication of changes to destination ports, an indication of changes to an action, and an indication of changes to a network protocol.

At 370, an indication of the semantic difference is output. For example, the indication of the semantic difference can be presented for display to a user, sent to a user, saved to a log file, etc.

In some implementations, the semantic difference is used to determine whether a change from a first device-level ACL file (e.g., the deployed ACL file) and a second device-level ACL file (e.g., the candidate ACL file) would be safe. A change can be considered safe if it does not result in an unintended reduction in availability (e.g., a mistake that cuts off hosts from reaching a group of servers) and it does not result in an unintended security problem (e.g., a mistake that changes access to a group of servers from just a couple web ports to all ports). A change can be considered safe if it falls below a calculated risk score. For example, a risk score can be calculated based on the semantic difference that indicates whether the semantic difference represents a safe change if the candidate ACL file is deployed. The risk score can be calculated by assigning values to the changes, where changes that delete hosts are weighted higher than changes that add hosts (e.g., deleting hosts from a permit rule, or adding hosts to a deny rule, can be viewed as having a higher likelihood of creating an availability event). For example, the values can correspond to the number of hosts being added and/or deleted, with weighting applied more heavily to deleted hosts (deleted from a permit rule and/or added to a deny rule) versus added hosts (added to a permit rule and/or deleted from a deny rule). In some implementations, a threshold value is established such that a candidate ACL file is automatically deployed if the risk score is below the threshold value. If the risk score is not below the threshold value, then the deployment can be delayed or stopped (e.g., an indication of the semantic difference can be provided for review by a user).

Figure 4:
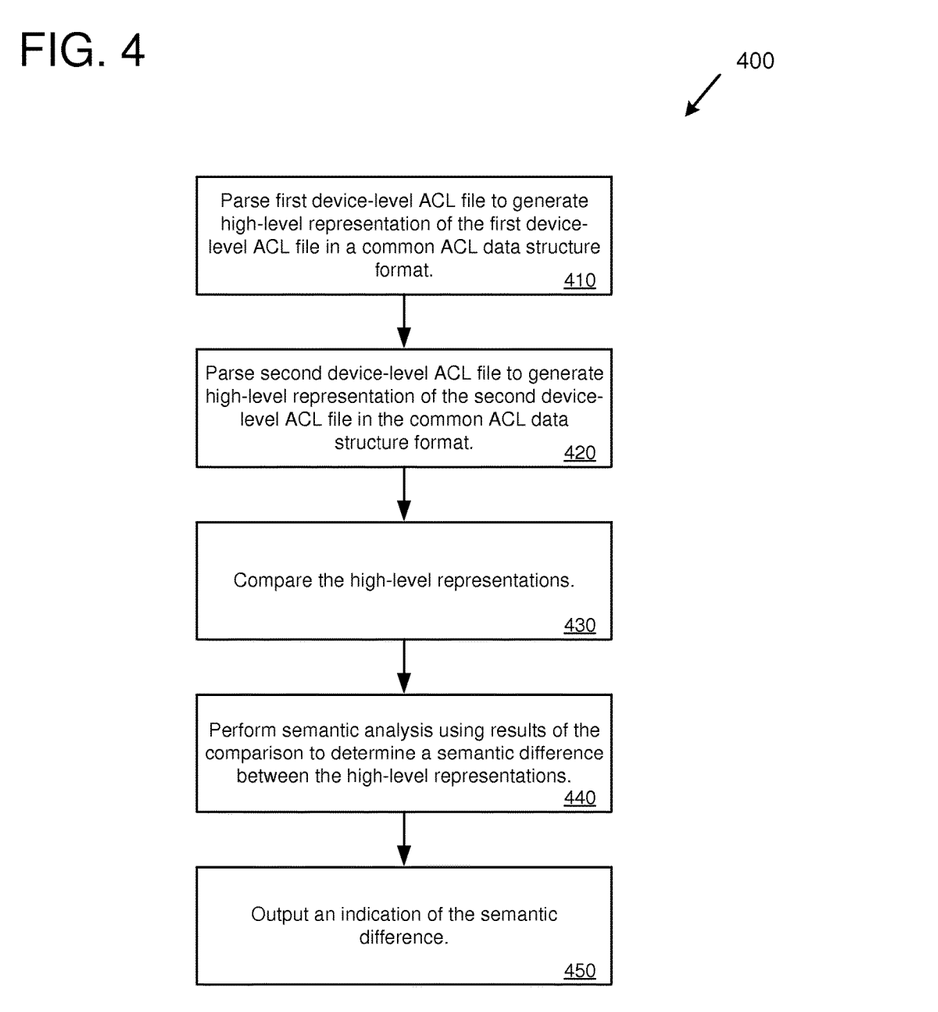
FIG. 4 is a flowchart of an example method for assessing the semantic difference between a first device-level ACL file and a second device-level ACL file.

FIG. 4 is a flow chart of an example method 400 for assessing the semantic difference between a first device-level ACL file (e.g., a deployed ACL file or another device-level ACL file) and a second device-level ACL file (e.g., a candidate ACL file or another device-level ACL file). At 410, a first device-level ACL file is parsed to generate a high-level representation of the first device-level ACL file in a common ACL data structure format. At 420, a second device-level ACL file is parsed to generate a high-level representation of the second device-level ACL file in the common ACL data structure format.

At 430, the high-level ACL representations generated at 410 and 420 are compared. For example, the comparison can be performed by determining differences in the data elements of the high-level representations. For example, differences may be present in one or more of the following data elements of the common ACL data structure format: action, network protocol, source hosts, source ports, destination hosts, and destination ports.

At 440, semantic analysis is performed using results of the comparison to determine the semantic difference between the high-level representations.

At 450, an indication of the semantic difference is output. For example, the indication of the semantic difference can be presented for display to a user, sent to a user, saved to a log file, etc.

Figure 5:
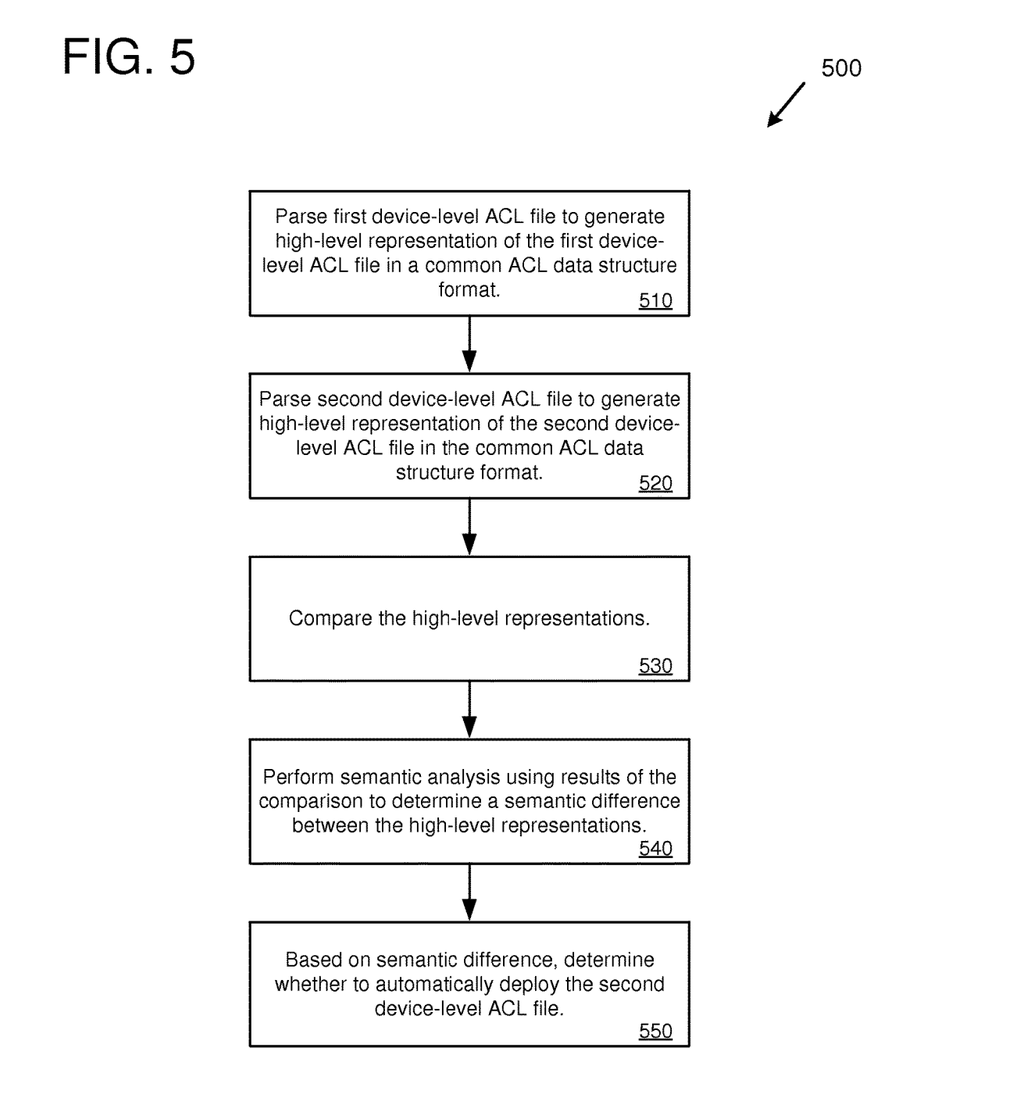
FIG. 5 is a flowchart of an example method for assessing the semantic difference between a first device-level ACL file and a second device-level ACL file, and determining whether to automatically deploy the second device-level ACL file.

FIG. 5 is a flow chart of an example method 500 for assessing the semantic difference between a first device-level ACL file (e.g., a deployed ACL file or another device-level ACL file) and a second device-level ACL file (e.g., a candidate ACL file or another device-level ACL file). At 510, a first device-level ACL file is parsed to generate a high-level representation of the first device-level ACL file in a common ACL data structure format. At 520, a second device-level ACL file is parsed to generate a high-level representation of the second device-level ACL file in the common ACL data structure format.

At 530, the high-level ACL representations generated at 510 and 520 are compared. For example, the comparison can be performed by determining differences in the data elements of the high-level representations. For example, differences may be present in one or more of the following data elements of the common ACL data structure format: action, network protocol, source hosts, source ports, destination hosts, and destination ports.

At 540, semantic analysis is performed using results of the comparison to determine the semantic difference between the high-level representations.

At 550, a determination is made based on the semantic difference. The determination is whether to automatically deploy the second device-level ACL file. For example, the first device-level ACL file can be currently deployed on a particular network device and the second device-level ACL file can be a candidate ACL file for replacing the first device-level ACL file currently deployed. If the semantic difference indicates that a change from the currently deployed ACL file to the candidate ACL file would be safe, then the candidate ACL file can be automatically deployed to the network device. If the semantic difference indicates that the change would not be safe, then automatic deployment can be delayed or halted (e.g., until it is reviewed by a user).

Example Service Provider Environments

Figure 6:
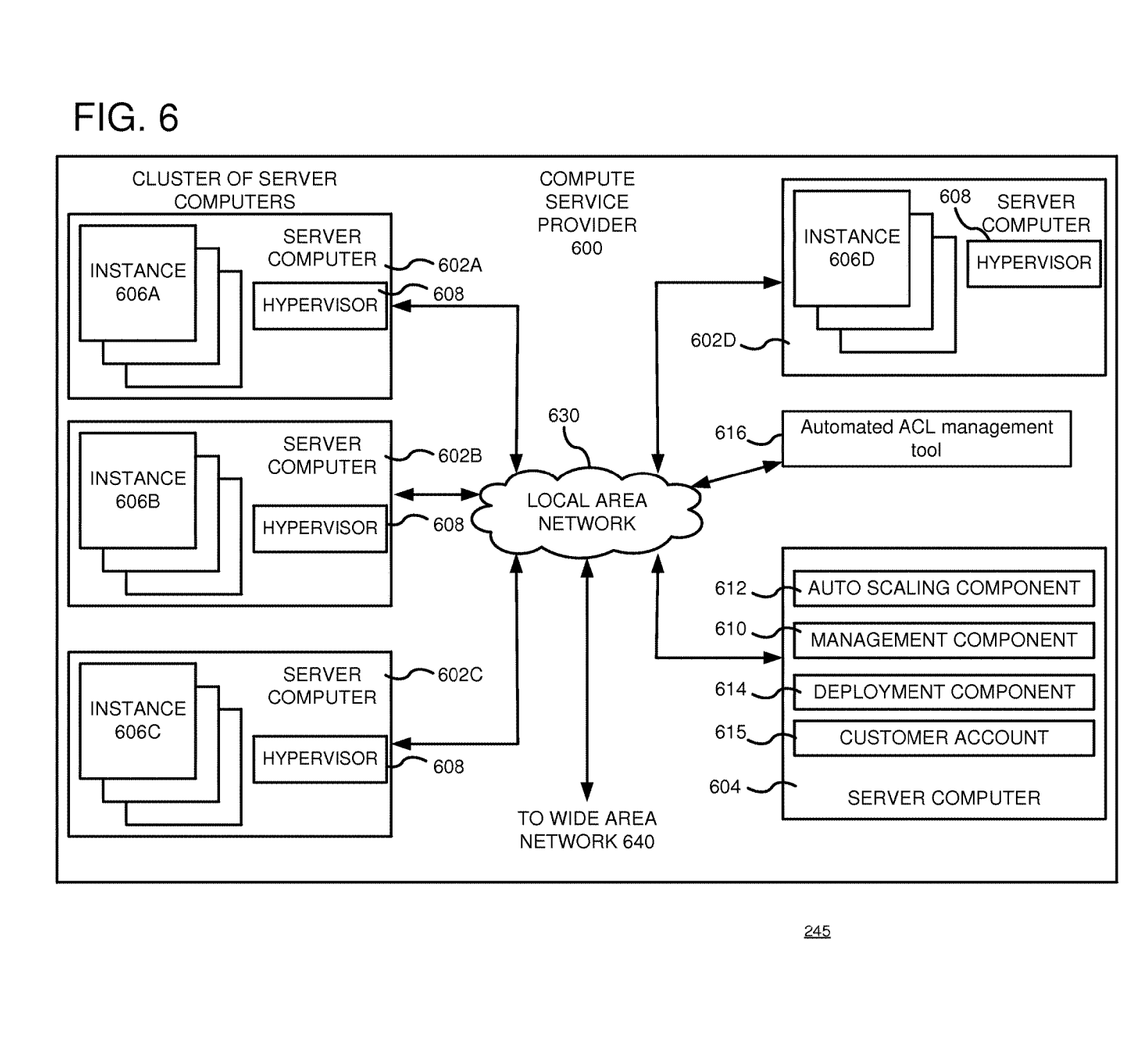
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can comprise a Clos network. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

In some implementations, an automated ACL management tool 616 performs operations for managing ACLs on the various network devices of the local area network 630. For example, the automated ACL management tool 616 can be used to create ACL rules, translate ACL rules to device-level ACL rules according to various network device ACL formats (e.g., manufacturer and/or network device type formats), obtain device-level ACL files (e.g., for deployed ACL files and/or candidate ACL files), parse device-level ACL files to generate high-level representations of the device-level ACL files in a common data structure format, compare the high-level representations, perform semantic analysis based on results of the comparison, and take other actions (e.g., output indications of the semantic difference, make automatic deployment decisions based on a risk score calculation, etc.).

Figure 7:
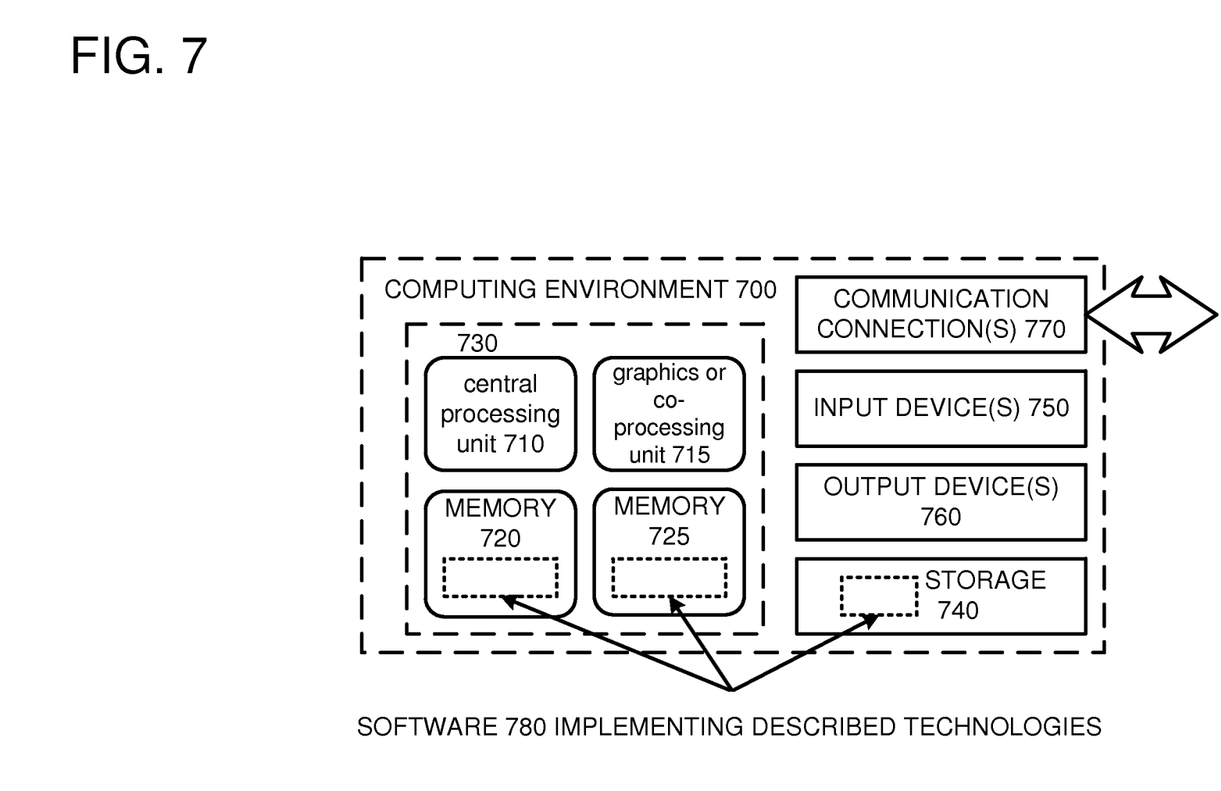
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a computing device, for assessing semantic difference between networking access control lists (ACLs), the method comprising:
   obtaining a deployed ACL file comprising ACL rules in a device-level representation for a network device;
   parsing the deployed ACL file to generate a high-level ACL representation of the deployed ACL file in a common ACL data structure format;
   obtaining a candidate ACL file in the device-level representation for replacing the deployed ACL file on the network device;
   parsing the candidate ACL file to generate a high-level ACL representation of the candidate ACL file in the common ACL data structure format;
   comparing the high-level ACL representation of the deployed ACL file and the high-level representation of the candidate ACL file;
   performing semantic analysis using results of the comparing to determine a semantic difference between the high-level ACL representation of the deployed ACL file and the high-level representation of the candidate ACL file;
   calculating a risk score based on the semantic difference, wherein the risk score indicates whether the semantic difference represents a safe change if the candidate ACL file is deployed, and wherein the risk score weights changes that delete hosts higher than changes that add hosts;
   comparing the risk score to a threshold value; and
   outputting an indication of whether the semantic difference represents a safe change.

2. The method of claim 1 wherein the deployed ACL file and the candidate ACL file are in the device-level representation for a particular type of network device, wherein the parsing comprises converting ACL rules from the device-level representation to the high-level ACL representation in the common ACL data structure format, and wherein the common ACL data structure format is a device independent format.

3. The method of claim 1 wherein parsing the deployed ACL file and the candidate ACL file comprises:
   identifying a plurality of ACLs associated with a rule identifier; and creating a single entry in the common ACL data structure format representing the plurality of ACLs.

4. The method of claim 1 wherein the common ACL data structure format contains entries comprising:
- a rule identifier;
- an action;
- a network protocol;
- a source host;
- a source port;
- a destination host; and
- a destination port.

5. The method of claim 1 wherein the semantic difference comprises:
- an indication of changes to source hosts;
- an indication of changes to destination hosts;
- an indication of changes to source ports;
- an indication of changes to destination ports;
- an indication of changes to an action; or
- an indication of changes to a network protocol.

6. A computing device comprising:
- a hardware processing unit;
- wherein the computing device is configured to perform operations for assessing semantic difference between networking access control lists (ACLs), the operations comprising:
  - parsing a first device-level ACL file to generate a high-level ACL representation of the first device-level ACL file in a common ACL data structure format;
  - parsing a second device-level ACL file to generate a high-level ACL representation of the second device-level ACL file in the common ACL data structure format;
  - comparing the high-level ACL representation of the first device-level ACL file and the high-level representation of the second device-level ACL file;
  - performing semantic analysis using results of the comparing to determine a semantic difference between the high-level ACL representation of the first device-level ACL file and the high-level representation of the second device-level ACL file;
  - calculating a risk score based on the semantic difference, wherein the risk score indicates whether the semantic difference represents an acceptable change if the second device-level ACL file is deployed, and wherein the risk score weights changes that delete hosts higher than changes that add hosts
  - comparing the risk score to a threshold value; and
  - determining whether to deploy the second device-level ACL file based at least in part on the comparison of the risk score to the threshold value.

7. The computing device of claim 6 wherein the first device-level ACL file and the second device-level ACL file are in a device-level representation for a particular type of network device, wherein the parsing comprises converting ACL rules from the device-level representation to the high-level ACL representation in the common ACL data structure format, and wherein the common ACL data structure format is a device independent format.

8. The computing device of claim 6 wherein the first and second device-level ACL files are in a particular device-level ACL format, the operations further comprising:
- parsing third and fourth device-level ACL files in a different device-level ACL format to generate high-level ACL representations of the third and fourth device-level ACL files in the common ACL data structure format.

9. The computing device of claim 6 wherein the parsing is extensible to support a plurality of different device-level ACL formats by providing a corresponding plurality of different parsers.

10. The computing device of claim 6 wherein parsing the first device-level ACL file and the second device-level ACL file comprises:
- identifying a plurality of ACLs associated with a rule identifier; and
- creating a single entry in the common ACL data structure format representing the plurality of ACLs.

11. The computing device of claim 6 wherein the common ACL data structure format contains entries comprising:
- a rule identifier;
- an action;
- a network protocol;
- a list of one or more source hosts; and
- a list of one or more destination hosts.

12. The computing device of claim 6 wherein the semantic difference comprises:
- an indication of changes to source hosts;
- an indication of changes to destination hosts;
- an indication of changes to source ports;
- an indication of changes to destination ports;
- an indication of changes to an action; or
- an indication of changes to a network protocol.

13. The computing device of claim 6, the operations further comprising:
- when the risk score is at or above the threshold value, delaying deployment of the second device-level ACL file; and
- when the risk score below the threshold value, deploying the second device-level ACL file to replace the first device-level ACL file on a network device.

14. The computing device of claim 6 wherein the first device-level ACL file has been deployed to a network device, and wherein the second device-level ACL file is a candidate ACL file for replacing the first device-level ACL file deployed on the network device.

15. A computer-readable storage medium storing computer-executable instructions for causing a computing device to perform operations for assessing semantic difference between networking access control lists (ACLs), the operations comprising:
- parsing a first device-level ACL file to generate a high-level ACL representation of the first device-level ACL file in a common ACL data structure format;
- parsing a second device-level ACL file to generate a high-level ACL representation of the second device-level ACL file in the common ACL data structure format;
- comparing the high-level ACL representation of the first device-level ACL file and the high-level representation of the second device-level ACL file;
- performing semantic analysis using results of the comparing to determine a semantic difference between the high-level ACL representation of the first device-level ACL file and the high-level representation of the second device-level ACL file; and
- based on the semantic difference, determining whether to deploy the second device-level ACL file to a network device to replace the first device level ACL file at the network device, wherein determining whether to deploy the second device-level ACL file comprises:
  - calculating a risk score based on the semantic difference, wherein the risk score indicates whether the semantic difference represents a safe change if the second device-level ACL file is deployed, and wherein the risk score weights changes that delete hosts higher than changes that add hosts; and comparing the risk score to a threshold value.

16. The computer-readable storage medium of claim 15 wherein the common ACL data structure format supports high-level ACL representations generated from different device-level ACL formats from corresponding different network device types.

17. The computer-readable storage medium of claim 15 wherein the common ACL data structure format contains entries comprising:

a rule identifier;
an action;
a network protocol;
a list of one or more source hosts; and
a list of one or more destination hosts.

* * * * *